United States Patent

[11] 3,543,931

| [72] | Inventor | Edward L. Rastatter<br>New York, New York |
|---|---|---|
| [21] | Appl. No. | 709,298 |
| [22] | Filed | Feb. 29, 1968 |
| [45] | Patented | Dec. 1, 1970 |
| [73] | Assignee | Nichols Engineering & Research Corporation<br>New York, New York<br>a corporation of Delaware |

[54] MULTIPLE CYCLONE ASSEMBLY
16 Claims, 6 Drawing Figs.

[52] U.S. Cl. .................................................. 209/211,
55/349, 209/144
[51] Int. Cl. ..................................................... 210/512,
B04c 5/28
[50] Field of Search ....................................... 209/211,
144; 210/512; 55/349

[56] References Cited
UNITED STATES PATENTS

| 2,622,735 | 12/1952 | Criner............................ | 209/211 |
| 2,956,679 | 10/1960 | Hoffmann ..................... | 209/144 |
| 3,057,476 | 10/1962 | Gilbert........................... | 209/211 |
| 3,335,860 | 8/1967 | Baxter............................ | 209/211 |

FOREIGN PATENTS

| 692,236 | 8/1964 | Canada ......................... | 209/211 |
| 817,342 | 7/1959 | Great Britain................ | 209/211 |

Primary Examiner—Frank W. Lutter
Attorney—Ward, Mc Elhannon, Brooks and Fitzpatrick ABSTRACT: A multiple cyclone assembly for separating material suspended in a fluid suspension including a plurality of modules which are independently connected to a common header system, and each module including a manifold system connected to the common header system and a plurality of conical cyclones connected to the manifold system, respectively.

INVENTOR.
EDWARD L. RASTATTER

MULTIPLE CYCLONE ASSEMBLY

This invention relates to cyclones and more particularly to a multiple cyclone assembly for separating material suspended in a fluid suspension wherein a plurality of hydrocyclones are connected in parallel relationship one with respect to the others. Among many possible applications, hydrocyclones according to this invention are useful for centrifugally separating impurities from wood pulp suspensions, for example. That is, the device causes the impurities to be rejected while the regular wood pulp fibers are maintained in liquid suspension.

Usually a hydrocyclone comprises an upper cylindrical portion which merges downwardly into a conical portion. There is an aperture or opening at the apex of the cone, and there is another aperture opening, coaxial with the apex opening, in the cover plate or head piece on the top of the cylindrical section. Also, there is a feed inlet means tangentially disposed with respect to the cylindrical section. In operation, the fluid suspension enters the cyclone through the feed inlet means under sufficient pressure to give it a high rotational movement during its passage down through the cone. The heavier fraction of the suspended solids is discharged from the cyclone through the apex opening while the lighter fraction is discharged through the opening in the cover plate. It will be appreciated that when separating fairly large and heavy particles suspended in liquid it is possible to use a large sized hydrocyclone and conversely when separating fairly small and light particles suspended in liquid, it is necessary to use a small sized hydrocyclone. In the latter case, substantial problems arise, especially when large volumetric quantities are to be processed. That is, a great many small size hydrocyclones operating in parallel must be employed to process the same amount of fluid suspension. This presents severe structural, operational, maintenance and space problems. Heretofore, attempts have been made to overcome these problems, but they have not been entirely satisfactory. In some of the prior art structures, the cyclones are formed by providing a plurality of hollow conical spaces inside an annularly shaped block. The inlet and outlet passages are openings in the block. A major disadvantage of this type of structure is that it is impossible to visually inspect the individual cyclones, particularly in the lower portion of the cyclone. In other prior art structures, the hydrocyclones are clustered in radially extending arrangements with their apexes pointing toward a common point or axis and their outer ends fitted to annular stock flow manifolds. However, in these prior art devices, when one or more of the internal passages become clogged, it is difficult to determine which passages are involved, and it is also difficult to physically clear the clogged passages. Moreover, it is necessary that the entire device be shut down in order to clear one passage. An object of this invention is to overcome the prior art difficulties.

Briefly, our invention contemplates the provision of a new and improved multiple cyclone assembly which comprises a plurality of hydrocyclone modules. Each of these modules includes a plurality of conical cyclones connected to individual manifold systems, respectively. A common header system is provided with means for independently connecting each module thereto.

In one form of our invention the common header system includes an elongated feed inlet header, an elongated accept outlet header, and an elongated reject header. Each of the modules is provided with a set of couplings which are disposed in proximity with each other so that each module may be individually connected or disconnected from the common header system without disturbing the remaining modules. This is particularly important because one module may be removed, cleaned, repaired, and then returned on the line without disturbing the operation of overall assembly. Further, in accordance with one form of our invention, the hydrocyclones extend in parallel relationship one with respect to the others and the sets of couplings are disposed in spaced relationship on the two opposing sides of the headers so that the longitudinal axis of the modules extend perpendicular to the longitudinal axis of the common header system. Each of the hydrocyclone modules includes an elongated upper inlet manifold, an elongated upper accept outlet manifold, and an elongated lower reject outlet manifold. Also, each module includes a plurality of conical cyclones disposed in spaced relationship with respect to each other and each being connected to their respective manifolds. The passages in the header and feed inlet manifold are tapered inwardly in the direction of the flow and the passages in the accept outlet header and manifold are tapered outwardly in the direction of flow. Also, the passages in the reject outlet manifold are outwardly tapered in the direction of flow. This ensures the maintenance of constant flow velocity throughout the headers and manifolds, respectively, thereby preventing the clogging of the pulp in suspension.

According to one form of the invention, each of the cyclones contains a sight glass at its apex end. Applicant's novel clustering of the hydrocyclones permits visual inspection of each individual sight glass. In normal operation of cyclones of this nature, there is a tendency for the cyclones to become clogged or plugged toward their small diameter end, i.e. in the vicinity of the sight glass. When this occurs, one module may be removed without having to shut down the remainder of the multiple cyclone assembly. A plurality of modules are employed so that the removal of one module scarcely affects, percentagewise, the overall operation of the apparatus. After the module has been removed, a nut threadably attached to the bottom of the conical section, is turned upwardly to release the sight glass. The chamber is then pulled down from the upper headers and may be cleaned and returned to the manifold for reassembly without disturbing the other hydrocyclones in the module. It will thus be appreciated that in this manner the various hydrocyclones may be cleaned or repaired in a simple, efficient manner, thereby substantially reducing the maintenance time and costs.

There has thus been outlined rather broadly the more important features of the invention in order that the detailed description thereof that follows may be better understood, and in order that the present contribution to the art may be better appreciated. There are, of course, additional features of the invention that will be described hereinafter which will form the subject of the claims appended hereto. Those skilled in the art will appreciate that the conception on which this disclosure is based may readily be utilized as the basis for the design of other structures for carrying out the several purposes of the invention. It is important, therefore, that the claims be regarded as including such equivalent constructions as do not depart from the spirit and scope of the invention.

One embodiment of the invention has been chosen for purposes of illustration and description, and is shown in the accompanying drawings, forming a part of the specification, wherein.

Figure 1:
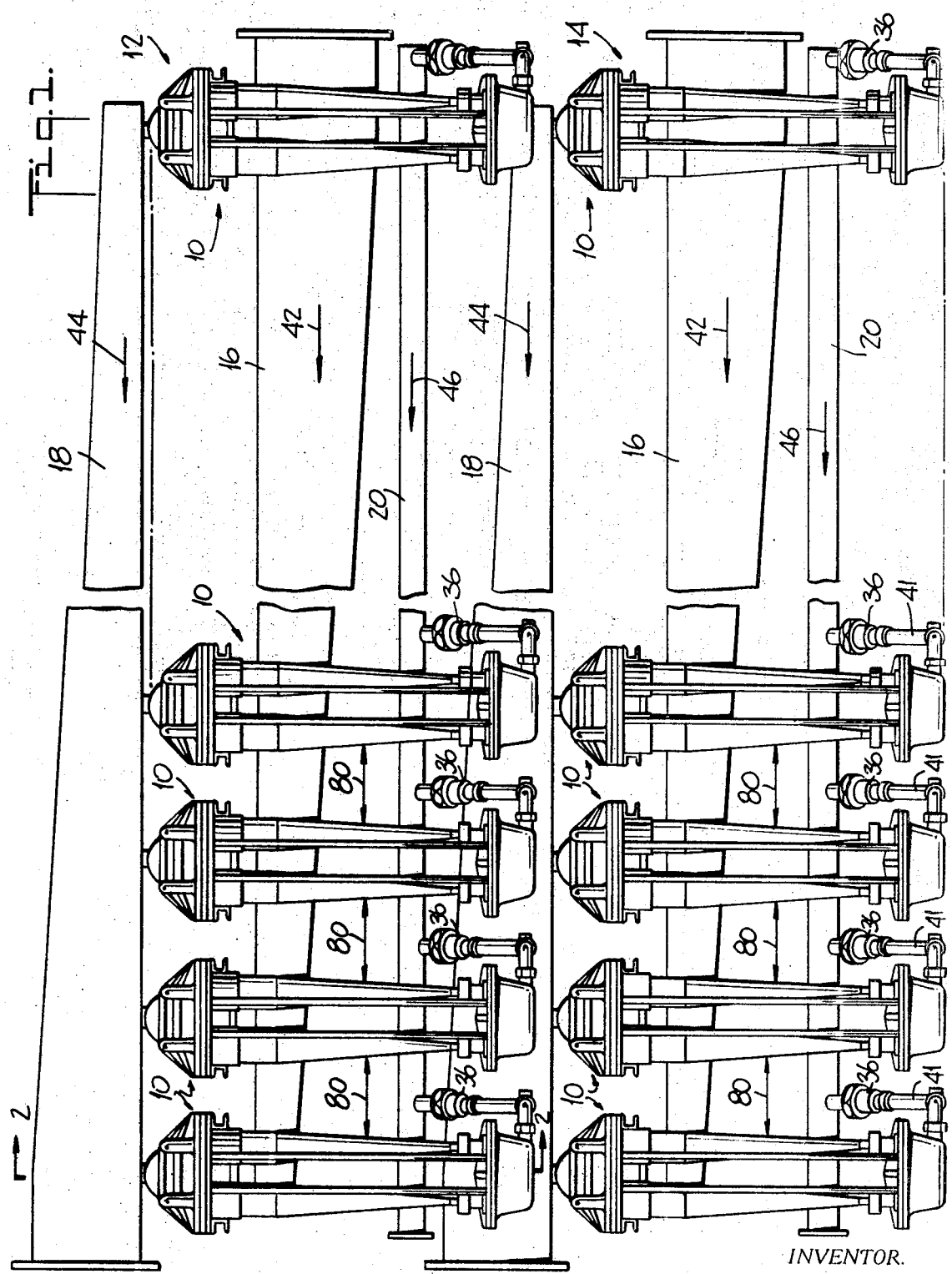
FIG. 1 is a side elevation of a multiple cyclone assembly constructed in accordance with the concept of this invention.
Figure 2:
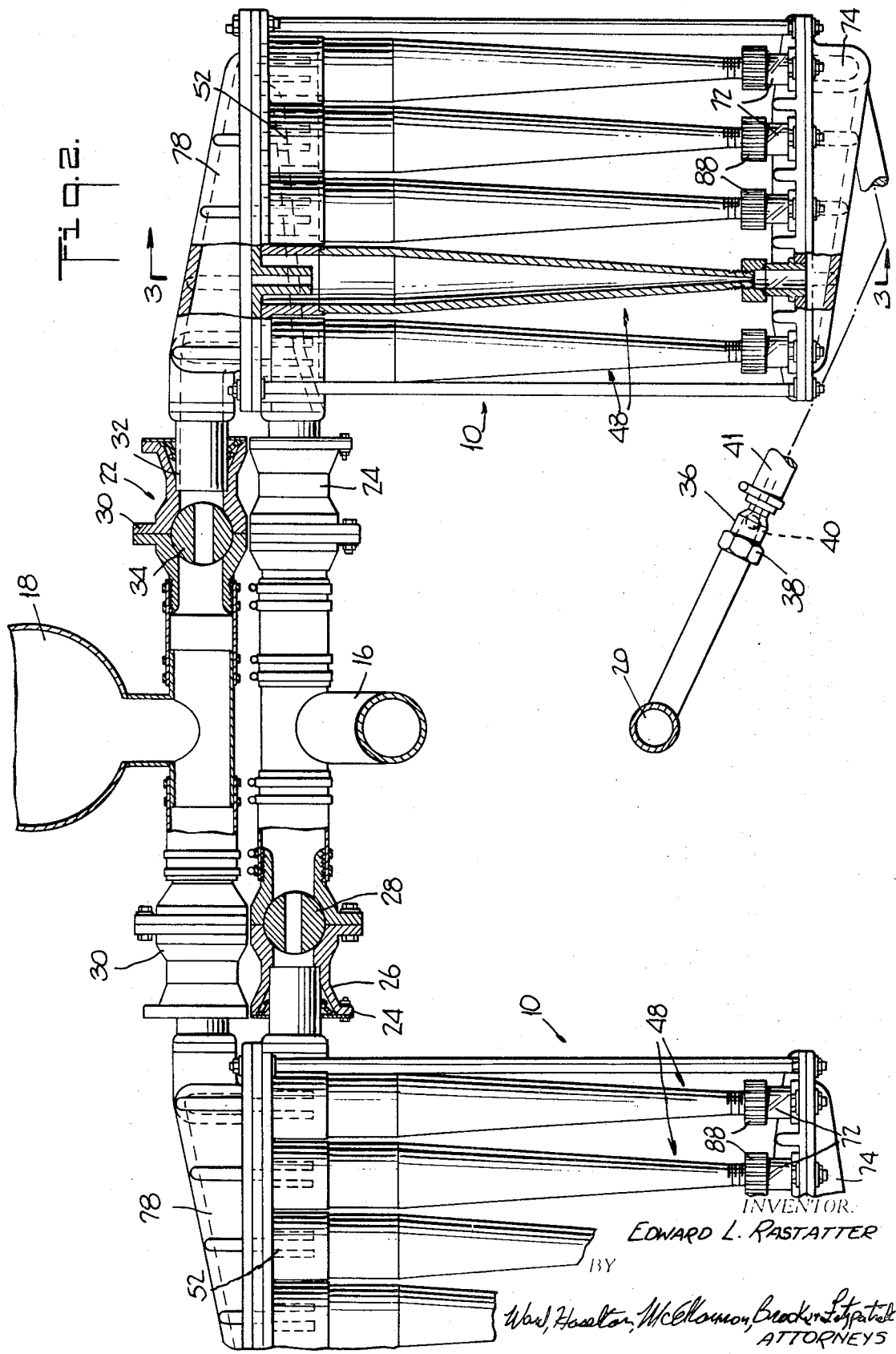
FIG. 2 is an enlarged sectional view taken along the line 2—2 of FIG. 1 and showing the interrelationship between the modules and the various headers.
Figure 6:
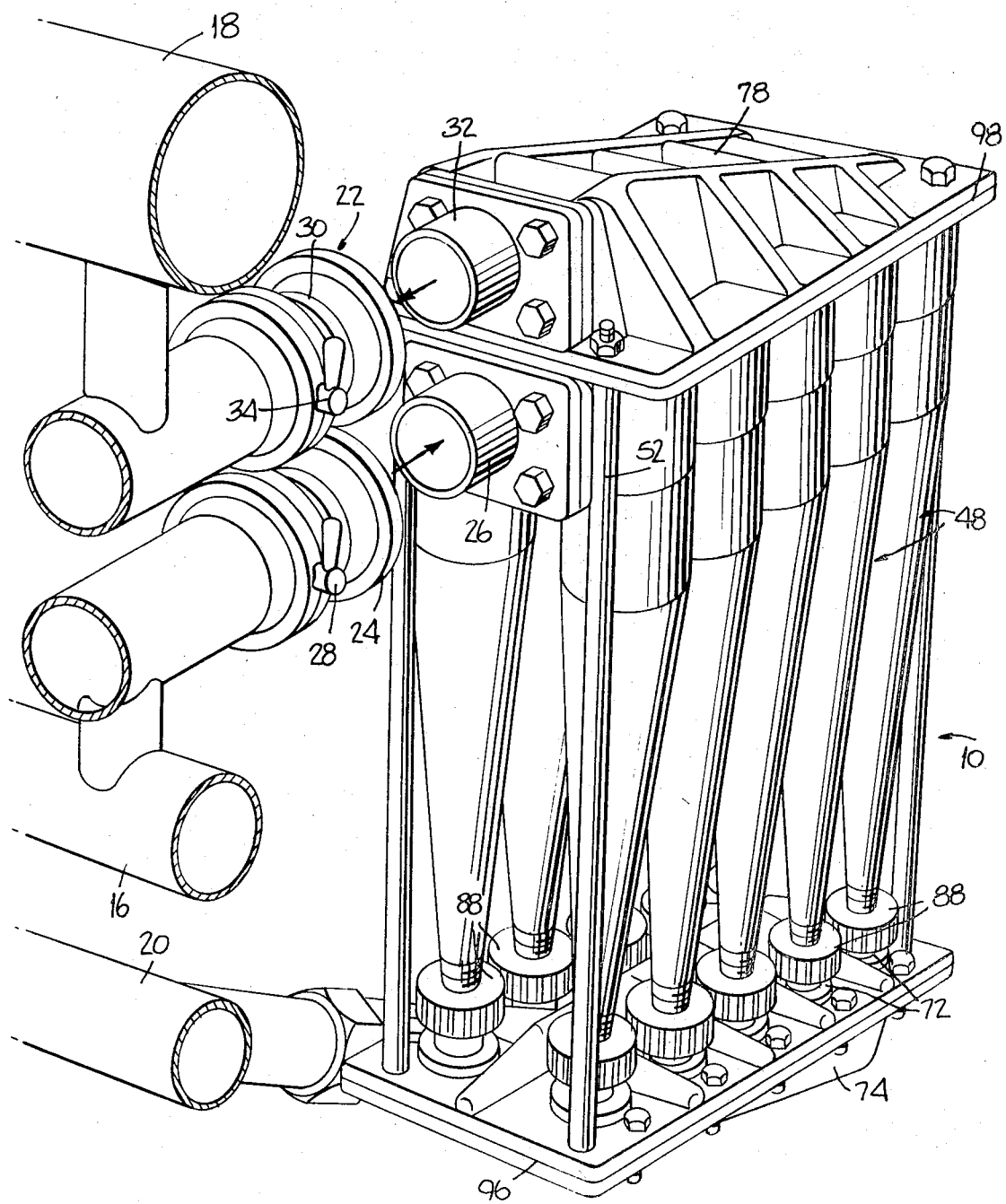
FIG. 6 is a perspective view showing the coupling means interconnecting the modules to the headers.

In the embodiment of the invention illustrated, and with particular reference to FIG. 1, the multiple cyclone assembly comprises a plurality of hydrocyclone modules indicated generally at 10 and a common header system, indicating generally at 12. A second common header system, indicated generally at 14, is vertically disposed with respect to the first common header assembly and is constructed and operates in the same manner. Means, not shown, interconnect the two header systems employed. As best seen in FIGS. 1, 2 and 6, each of the common header systems includes an elongated substantially horizontally disposed feed inlet header 16, an elongated substantially horizontally disposed accept outlet header 18, and an elongated substantially horizontally disposed reject header 20. Each module 10 is provided with a set of couplings indicated generally at 22, FIGS. 2 and 6, to facilitate removably connecting each module to the common header system independently with respect to the others. As best seen in FIG. 2 each set of couplings comprises a feed inlet coupling 24 which includes a socket-type joint 26 and a stop valve 28, and an accept outlet coupling 30 which includes a socket-type joint 32 and a stop valve 34. Also, the set of couplings comprises a reject outlet coupling 36 which includes a screw-type joint 38 and a ball check valve 40. For simplifying the alinement problem, a flexible hose 41 connects the reject coupling 36 to the reject outlet manifold 74. The module is disconnected from the assembly at the joint 26, 32, and 36. The stop valves 28 and 34 are manually closed and the ball check valve 40 is automatically closed, thereby allowing the module to be removed while the remainder of the multiple cyclone assembly continues in normal operation.

As best seen in FIGS. 1 and 2, the headers 16, 18 and 20 extend in substantially parallel relationship one with respect to the others and the sets of couplings are disposed in spaced relationship one with respect to the others on the two opposing sides of the headers, respectively, so that the longitudinal axis of the modules extend substantially perpendicular to the longitudinal axis of the common header system. Reverting to FIG. 1, the direction of flow of the fluid suspension is indicated by the arrow 42 in the feed inlet header 16. The passage in this header is preferably tapered inwardly in the direction of flow to maintain a substantially constant velocity of flow throughout the header to assure uniform delivering of pulp slurry to each module by reason of equal velocity in the header at each module entry. The direction of flow of the accept outlet header 18 is indicated by the arrow 44. The passage in this header is tapered outwardly in the direction of flow to maintain substantially constant velocity for the same reasons. Direction of flow in the reject outlet header 20 is indicated by the arrow 46. While the passage in this header may be tapered outwardly in the direction of flow this is not necessary. Reject header 20 should be sized so that substantially no pressure gradient exists along its length so that the same back pressure is applied to the reject manifold of each module.

Figure 3:
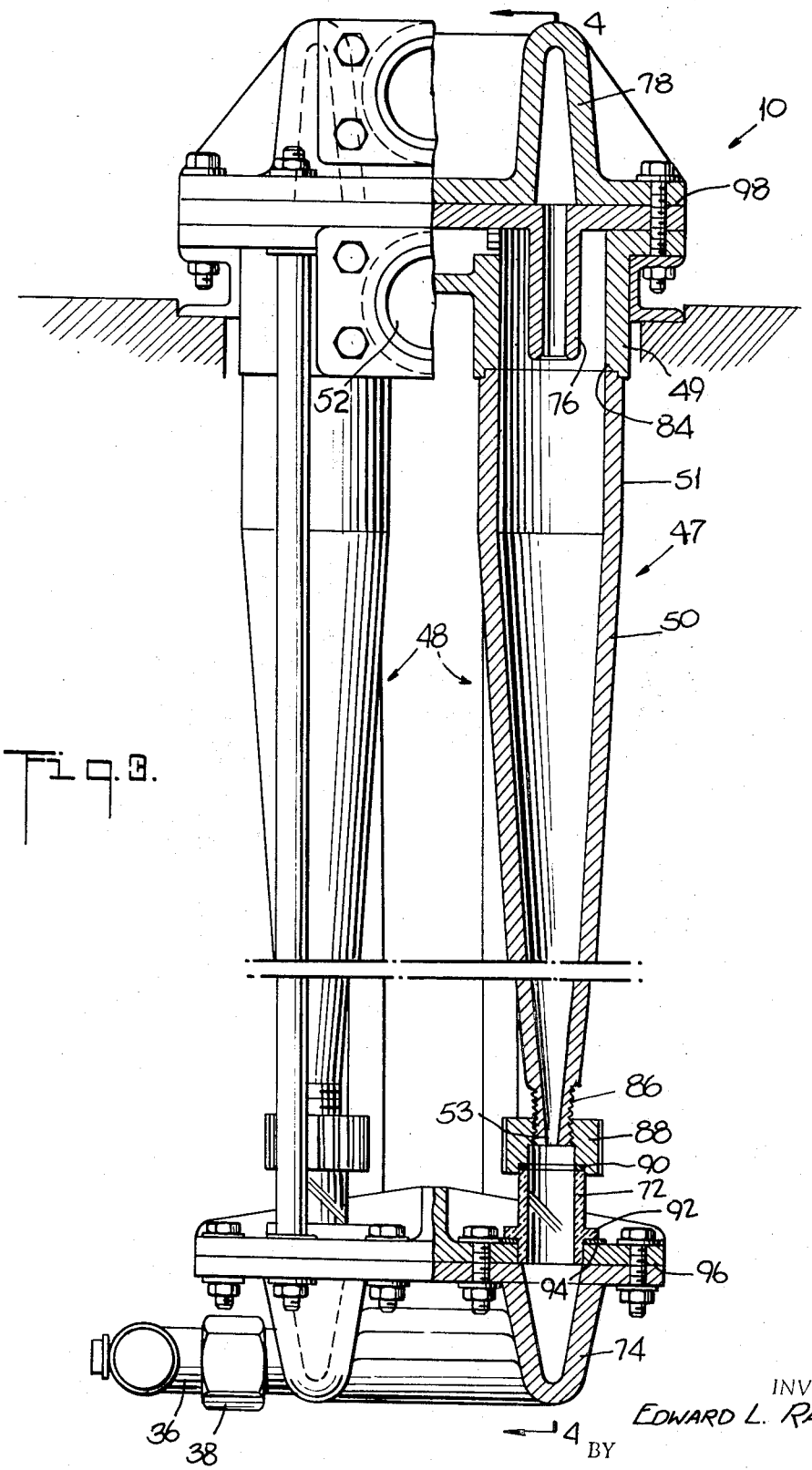
FIG. 3 is an enlarged sectional view taken along the line 3—3 of FIG. 2 and showing details of the interconnection between the hydrocyclones and the headers.
Figure 4:
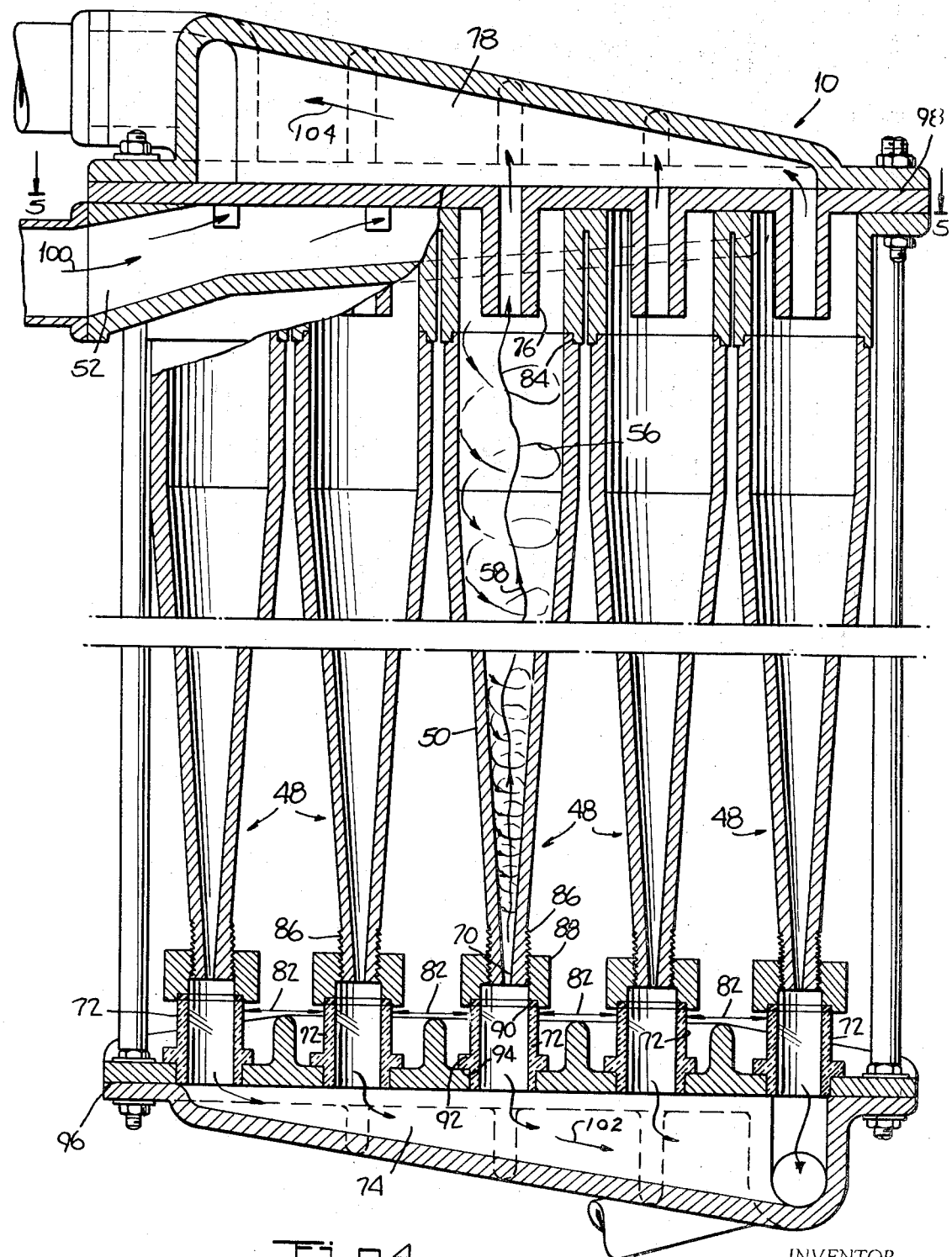
FIG. 4 is a sectional view, drawn on a reduced scale, taken along the line 4—4 of FIG. 3.

Each of the hydrocyclone modules 10 comprises a plurality of hydrocyclones indicated generally at 48, FIG. 2. In the illustrated embodiment, ten cyclones are shown. As best seen in FIGS. 3 and 4, each cyclone, indicated generally at 48, includes a cylindrical section 49 followed by an elongated chamber 47 of circular cross section and having an upper cylindrical section 51 and a lower conical section 50. This cone 50 is truncated to provide an orifice 53 at its apex to discharge the reject particles.

Figure 5:
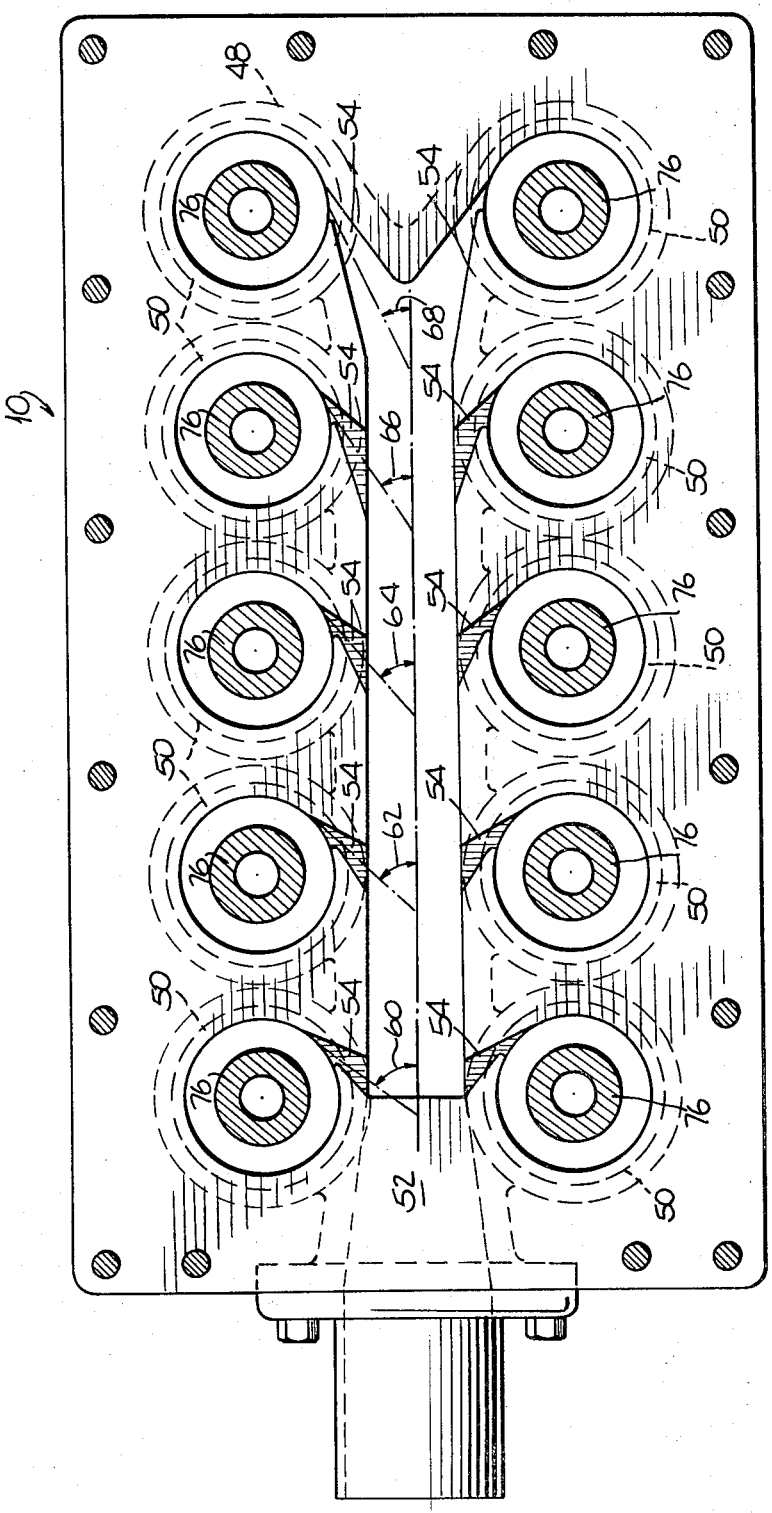
FIG. 5 is a plan view of a module according to the invention.

Usually this chamber has a length equal to several times its diameter. When treating wood pulp suspensions, the diameter diameter of the chamber is preferably of the order of about 2¼ 'inches and the length is of the order of about 22 'inches. The diameter to length ratio is of the order of about 1 to 10, and the cone angle is of the order of about 7.2°. At the upper end of the cyclone 48 is a head piece for the feed inlet manifold 52. The feed inlet manifold 52 has outlets 54, FIG. 5, which are shaped to inject stock to be treated generally tangentially into the cyclone 48 in a manner to cause a helical flow of the liquid mixture (as indicated by 56, FIG. 4) downwardly along the inside walls thereof to the region at or adjacent the lower end 53 of the conical section 50 the helical flow or vortex then reversing and forming an inner upwardly moving vortex, as indicated by the helix 58 (FIG. 4). The outlets 54 may be disposed at angles indicated at 60, 62, 64, 66, 68 with respect to the axis of the feed inlet manifold centerline. These angles may be of decreasing value from left to right as viewed in FIG. 5, such as about 52°, about 45°, about 38°, about 37°, about 24°, respectively, for example. Any impurities or other reject material heavier than the liquid will be flung outwardly in the helical flow toward the internal wall surfaces of the chamber, and these particles will pass toward the bottom of the chamber and are discharged along with a small amount of liquid through the apex opening 70, through a sight glass 72 and into the reject outlet manifold 74. The treated stock or accept is embodied largely within the upwardly flowing inner vortex 58 and is allowed to pass up through a central passage 76, FIGS. 3 and 4, extending downwardly from the accept outlet manifold 78. When treating wood pulp suspensions, the pressure in the feed inlet manifold is of the order of about 30 p.s.i. and the pressure in the accept outlet heater is of the order of about 5 p.s.i. The reject outlet manifold pressure is maintained at about 10 feet of water for these inlet and accept pressures. The latter pressure is carefully controlled by means of a valve (not shown) in the reject outlet header. This pressure critically affects the satisfactory performance of the apparatus, and it varies with the type of material being processed, such as between hard wood and soft wood, for example.

As pointed out hereinbefore, the individual cyclones occasionally become clogged toward their lower apex ends, adjacent the sight glass 72, and the only way to determine whether or not the cyclone is clogged is by means of the sight glass. As best seen in FIG. 1, the modules 10 are spaced a distance 80 from each other, and as best seen in FIG. 4, the individual cyclones are spaced a distance 82 from each other to permit visual inspection of each sight glass 72 so that upon clogging of the cyclone, remedial action can readily be taken. As pointed out hereinbefore, a module 10 may readily be removed from the multiple cyclone assembly to facilitate maintenance or repair. Each individual cyclone 48 FIGS. 3 and 4) may readily be disassembled from its associated manifolds. The chamber 47 is connected to the feed inlet manifold by a socket-type connection, as at 84. The apex end 53 of the section 50 has a threaded portion 86 and a finger nut 88 is mounted thereon. A socket-type connection is employed between the bottom of the nut 88 and the upper end of the sight glass 72 as at 90, and the lower end of the sight glass is provided with a flange 92 which rests on a shoulder of the reject outlet manifold 74, as at 94. The cyclone 48 is disassembled by screwing the nut 88 upwardly to release the sight glass 72, removing the sight glass and thence lowering the chamber 47 from engagement with the feed inlet manifold 52. The cyclone 48 is assembled by taking the same steps in the reverse order. Still referring to FIGS. 3 and 4, the reject outlet manifold 74 is formed in two portions which which are bolted together in sealed relationship as at The accept outlet manifold 78 is bolted on the top of the feed inlet manifold 52 in sealed relationship, as at 98, thereby in effect forming a cover for the feed inlet manifold. It will be appreciated that in order to maintain constant velocity and to prevent accumulation and clogging, the passages in the feed inlet manifolds 52 are tapered inwardly in the direction of flow as indicated by the arrow 100 in FIG. 4, and the passages in the reject outlet manifold 74 and the accept outlet manifolds 78 are tapered outwardly in the direction of flow as indicated by the arrows 102 and 104, respectively, in FIG. 4.

The cyclone chamber 47 may be fabricated from any suitable material, but due to the fact that a large number of chambers are required for each multiple cyclone assembly it is preferred to utilize an injection molding resin such as nylon, thereby reducing production costs. Preferred materials also include "Delrin" which is a trade name for an acetal resin as supplied by E. I. DuPont de Nemours and Co. Inc. Another desirable material is "Lexan" which is a trade name for a polycarbonate resin as supplied by General Electric Co. The latter material is transparent, and hence when it is utilized a separate sight glass is not required, as the entire cyclone chamber can be visually inspected.

The manifolds may be fabricated from any of the above materials referred to with respect to the cyclone chamber. As the abrasion wear in these manifolds is much less than in the conical sections casting resins, such as polyurethane or hard rubber may be used. Preferably the headers are fabricated from stainless steel.

Although one embodiment of the invention is illustrated in the drawings in upright position with the feed inlet manifold at the top and the reject outlet manifold at the bottom, such assembly may, if desired, be placed in various other positions, or even inverted without interfering with the proper action of the vortexes therein, because the velocity of the liquid in the vortexes is so high and the resulting centrifugal forces so large, that, by comparison, the effect of gravity on the mixture or components thereof is relatively unimportant. Accordingly, where reference herein is made to the top or bottom portions of the assembly, it will be understood that such terms are used merely for convenience in referring to the assembly in the position shown, and is not intended to limit the scope of the invention to assemblies necessarily positioned upright as shown.

It will thus be seen that the present invention does indeed provide an improved multiple cyclone assembly which is superior in simplicity, economy, efficiency, maintenance and repair as compared to prior art devices. Although a certain particular embodiment of the invention is herein disclosed for purposes of explanation, various modifications thereof, after study of the specification will be apparent to those skilled in the art to which the invention pertains and reference should accordingly be had to the appended claims in determining the scope of the invention.

I claim:

1. A hydrocyclone module for separating material suspended in a fluid suspension and adapted for use in a multiple cyclone assembly comprising a plurality of conical cyclone chambers arranged to house a moving vortex of said fluid suspension, an inlet manifold for injecting said fluid suspension into each of said conical cyclone chambers, an accept outlet manifold for removing said fluid suspension from each of said conical cyclone chambers, a reject outlet manifold for removing from each of said conical cyclones material separated by said moving vortex from said fluid suspension, said inlet manifold and said reject outlet manifold being spaced apart and defining supports for opposite axial ends of said conical cyclone chambers, each of said conical cyclone chambers being releasably insertable between said spaced apart inlet manifold and reject outlet manifold and means associated with each of said conical cyclone chambers for releasably connecting same to said reject manifold and causing said conical cyclone chamber to be in hydraulically sealed communication with said inlet manifold whereby each conical cyclone chamber may be readily removed from its associated module.

2. A hydrocyclone module as in claim 1 wherein said multiple cyclone assembly includes a plurality of said modules, a common header system, said header system including a feed inlet header, an accept outlet header, and a reject outlet header, and wherein said module includes means for independently connecting said inlet manifold to said feed inlet header, said accept outlet manifold to said accept outlet header and said reject outlet manifold to said reject outlet header.

3. A hydrocyclone module according to claim 2 wherein said means for independently connecting said module to a said common header system comprises a set of releasable couplings carried by said module, said set of couplings including a feed inlet coupling, an accept outlet coupling and a reject outlet coupling, the couplings in said set being disposed in proximity with each other, whereby each module may be individually connected and disconnected from said common header system without disturbing the remaining modules.

4. A hydrocyclone module according to claim 3 wherein said headers are elongated and extend parallel one to the others, and wherein said set of couplings are disposed in spaced relationship one with respect to the others, whereby the longitudinal axis of said module extends substantially perpendicular to the longitudinal axes of said common header system, respectively.

5. A hydrocyclone module according to claim 2 wherein the passage in said feed inlet header is tapered inwardly in the direction of flow, and wherein the passage in said accept outlet header is tapered outwardly in the direction of flow.

6. A hydrocyclone module according to claim 1 wherein said accept outlet manifold is connected in fluid flow communication to the upper portion of said conical cyclone and above the feed inlet connection.

7. A hydrocyclone module according to claim 1 wherein each of said conical cyclone chambers have a diameter to length ratio of the order of about 1 to 10 and a cone angle of the order of about 7.2°.

8. A hydrocyclone module according to claim 1 wherein each of said conical cyclone chambers has a maximum diameter of the order of about 2¼ inches and a length of the order of about 22 inches, and wherein the pressure in said feed inlet manifold is of the order of about 30 p.s.i., the pressure in said accept outlet manifold is of the order of about 5 p.s.i., and the pressure in said reject outlet manifold is of the order of about 10 feet head of water.

9. A hydrocyclone module according to claim 1 wherein said manifolds are elongated and extend in substantially horizontal parallel relationship one with respect to the others and wherein said conical cyclone chambers are substantially vertically disposed and are connected to the sides of said manifolds respectively.

10. A hydrocyclone module according to claim 9 wherein there are five conical cyclone chambers disposed on each side of said manifold, respectively.

11. A hydrocyclone module according to claim 1 wherein the passage in said feed inlet manifold is tapered inwardly in the direction of flow, and wherein the passages in said accept outlet manifold and said outlet reject outlet manifold are tapered outwardly in the direction of flow.

12. The hydrocyclone module according to claim 1 wherein each of said conical cyclone chambers is provided with means for determining when said cyclone chamber becomes inoperative.

13. A hydrocyclone module according to claim 1 wherein said means associated with each of said conical cyclone chambers includes a sight glass, and wherein said conical cyclone chambers are positioned with respect to each other to permit visual access to each sight glass.

14. A multiple cyclone assembly for separating material suspended in a fluid suspension, said assembly comprising a plurality of hydrocyclone modules, a common header system, said header system including an elongated feed inlet header, an elongated accept outlet header, and an elongated reject header, each module having a set of couplings for independently removably connecting each module to said common header system, each set of couplings including a feed inlet coupling, an accept outlet coupling and a reject outlet coupling, the couplings in each set being disposed in proximity with each other, said headers extending parallel one to the others, said sets of couplings being disposed in spaced relationship one with respect to the others on two opposing sides of said headers respectively, whereby the longitudinal axes of said modules extends substantially perpendicular to the longitudinal axis of said common header system respectively, each of said hydrocyclone modules comprising an elongated upper inlet manifold, an elongated upper accept outlet manifold, and an elongated lower reject outlet manifold, a plurality of conical cyclones disposed in spaced relationships one with respect to the others extending between the upper and lower manifolds and connection means interposed between said cyclones and said manifolds respectively, whereby the feed inlet manifold is connected to the upper portion of the cyclone, the accept outlet manifold is connected to the upper portion of said cyclone above the feed inlet connection and the reject outlet manifold is connected to the lower portion of the cyclone; the passages in said feed inlet header and manifold being tapered inwardly in the direction of flow, and the passages in said accept outlet header and manifold and said reject outlet manifold being tapered outwardly in the direction of flow; and each of said cyclones containing a sight glass at its apex end, said cyclones being positioned with respect to each other to permit visual access to each sight glass, each of said cyclones comprising a chamber, a socket-type connection interconnecting said chamber and said feed inlet manifold in fluid flow communication, the apex of said chamber having a threaded portion, a nut mountable on said threads, a socket-type connection interconnecting the bottom of said nut with the upper end of said sight glass, the lower end of said sight glasses being in fluid flow communication with said reject outlet manifold, said cyclone being disassembled by screwing said nut upwardly to release said sight glass and then lowering said chamber from engagement with said feed inlet manifold.

15. A multiple cyclone assembly for separating material suspended in a fluid suspension, said assembly comprising a plurality of hydrocyclone modules, a common header system, means for independently connecting each module to said common header system, said header system including a feed inlet header, an accept outlet header, and a reject outlet header; each of said hydrocyclone modules including a feed inlet manifold connected to said inlet header, an accept outlet header, a reject manifold connected to said reject outlet header, and a plurality of conical cyclones, each cyclone being connected to said feed inlet manifold, to said accept outlet manifold and to said reject outlet manifold, respectively, a sight glass at the apex of each cyclone, said cyclones being positioned with respect to each other to permit visual access to each sight glass, each of said cyclones including a chamber, a socket-type connection interconnecting said chamber and said feed inlet manifold in fluid flow communication, the apex end of said chamber having a threaded portion, a nut mountable on said threads, a socket-type connection interconnecting the bottom of said nut with the upper end of said sight glass, the lower end of said sight glass being in fluid flow communication with said reject outlet manifold, said cyclone being disassembled by screwing said nut upwardly to release said sight glass and then lowering sad said chamber from engagement with said feed inlet manifold.

16. A multiple cyclone assembly for separating material suspended in a fluid suspension, said assembly comprising a plurality of hydrocyclone modules, a common header system, means for independently connecting each module to said common header system, said header system including a feed inlet header, an accept outlet header, and a reject outlet header; each of said hydrocyclone modules including a feed inlet manifold connected to said inlet header, an accept outlet manifold connected to said accept outlet header, a reject manifold connected to said reject outlet header, and a plurality of conical cyclones, each cyclone being connected to said feed inlet manifold, to said accept outlet manifold and to said reject outlet manifold, respectively, a sight glass at the apex end of each cyclone, said cyclones being positioned with respect to each other to permit visual access to each sight glass, wherein each of said cyclones including a chamber, a socket-type connection interconnecting said chamber and said feed inlet manifold in fluid flow communication, the apex end of said chamber having a threaded portion, a nut mountable on said threads, a socket-type connection interconnecting the bottom of said nut with the upper end of said sight glass, the lower end of said sight glass being in fluid flow communication with said reject outlet manifold, said cyclone being disassembled by screwing said nut upwardly to release said sight glass and then lowering said chamber from engagement with said feed inlet manifold and said accept outlet manifold is mounted on said feed inlet manifold and a central passage interconnects the top of said chamber with said accept outlet manifold in fluid flow communications.

PO-1050
(5/69)

UNITED STATES PATENT OFFICE
CERTIFICATE OF CORRECTION

Patent No. 3,543,931            Dated December 1, 1970

Inventor(s) EDWARD L. RASTATTER

It is certified that error appears in the above-identified patent and that said Letters Patent are hereby corrected as shown below:

Column 4, line 49, after "reverse order." Start new paragraph --Still referring-- etc.

" 4, line 51, after "at" insert --96--.

Signed and sealed this 13th day of April 1971.

(SEAL)
Attest:

EDWARD M. FLETCHER, JR.          WILLIAM E. SCHUYLER, JR.
Attesting Officer                 Commissioner of Patents